(12) United States Patent
Shmukler et al.

(10) Patent No.: US 8,690,110 B2
(45) Date of Patent: Apr. 8, 2014

(54) BRACKET FOR CONNECTION OF A JUNCTION BOX TO PHOTOVOLTAIC PANELS

(75) Inventors: Vadim Shmukler, Rishon-Lezion (IL); Lior Handelsman, Givataim (IL); Nir Armoni, Raanana (IL)

(73) Assignee: Solaredge Technologies Ltd., Hod Hasharon (IL)

( * ) Notice: Subject to any disclaimer, the term of this patent is extended or adjusted under 35 U.S.C. 154(b) by 138 days.

(21) Appl. No.: 12/786,894

(22) Filed: May 25, 2010

(65) Prior Publication Data

US 2010/0294903 A1 Nov. 25, 2010

Related U.S. Application Data

(60) Provisional application No. 61/180,912, filed on May 25, 2009.

(51) Int. Cl.
*A47G 29/02* (2006.01)
(52) U.S. Cl.
USPC .......................... 248/237; 248/906; 52/173.3
(58) Field of Classification Search
USPC .......... 248/694, 237, 906; 136/244; 52/173.3; 126/623
See application file for complete search history.

(56) References Cited

U.S. PATENT DOCUMENTS

| | | | | |
|---|---|---|---|---|
| 4,150,660 A | * | 4/1979 | Peters et al. | 126/598 |
| 4,460,232 A | | 7/1984 | Sotlongo | |
| 4,903,851 A | * | 2/1990 | Slough | 220/3.9 |
| 6,105,317 A | * | 8/2000 | Tomiuchi et al. | 52/173.3 |
| 6,145,264 A | * | 11/2000 | Dallaire | 52/506.07 |
| 6,672,018 B2 | * | 1/2004 | Shingleton | 52/173.3 |
| 7,097,516 B2 | | 8/2006 | Werner et al. | |
| 7,291,036 B1 | | 11/2007 | Daily et al. | |
| 7,435,134 B2 | * | 10/2008 | Lenox | 439/567 |
| 7,435,897 B2 | * | 10/2008 | Russell | 136/244 |
| 7,600,349 B2 | * | 10/2009 | Liebendorfer | 52/173.3 |
| 7,748,175 B2 | * | 7/2010 | Liebendorfer | 52/173.3 |
| 7,759,575 B2 | | 7/2010 | Jones et al. | |
| 7,763,807 B2 | | 7/2010 | Richter | |

(Continued)

FOREIGN PATENT DOCUMENTS

| | | |
|---|---|---|
| JP | 2007058845 | 3/2007 |
| WO | 9313587 | 7/1993 |
| WO | 9613093 | 5/1996 |

OTHER PUBLICATIONS

International Search Report for PCT/IB2007/004610 dated Feb. 23, 2009.

(Continued)

*Primary Examiner* — Bradley Duckworth
(74) *Attorney, Agent, or Firm* — Banner & Witcoff, Ltd.

(57) ABSTRACT

A device for attaching a junction box to a photovoltaic. The photovoltaic panel has a photovoltaic side and a non-photovoltaic side. The device includes a bracket with a first side attachable to the junction box and a second side attachable to the non-photovoltaic surface of the photovoltaic panel. A central fastener is attachable at one end to the bracket and a plate is adapted for connecting to the other end of the central fastener and for mounting on the photovoltaic side of the photovoltaic panel. One or more rotatable spacers, connectible to the central fastener, may be located on the non-photovoltaic side of the photovoltaic panel. One or more fixed spacers may be located on the non-photovoltaic side connectible to the bracket.

20 Claims, 5 Drawing Sheets

(56) References Cited

U.S. PATENT DOCUMENTS

| | | | |
|---|---|---|---|
| 7,780,472 B2* | 8/2010 | Lenox | 439/567 |
| 7,956,280 B2* | 6/2011 | Kobayashi | 136/251 |
| 7,960,650 B2 | 6/2011 | Richter et al. | |
| 8,156,697 B2* | 4/2012 | Miros et al. | 52/173.3 |
| 8,181,402 B2* | 5/2012 | Tsuzuki et al. | 52/173.3 |
| 8,191,321 B2* | 6/2012 | McClellan et al. | 52/173.3 |
| 8,266,848 B2* | 9/2012 | Miros et al. | 52/173.3 |
| 2005/0068820 A1 | 3/2005 | Radosevich et al. | |
| 2009/0084570 A1 | 4/2009 | Gherardini et al. | |
| 2009/0250580 A1* | 10/2009 | Strizki | 248/309.1 |
| 2009/0282755 A1* | 11/2009 | Abbott et al. | 52/173.3 |
| 2010/0269430 A1* | 10/2010 | Haddock | 52/173.3 |
| 2010/0282290 A1* | 11/2010 | Schwarze et al. | 136/244 |
| 2010/0294528 A1 | 11/2010 | Sella et al. | |
| 2010/0297860 A1 | 11/2010 | Shmukler et al. | |
| 2011/0114154 A1* | 5/2011 | Lichy et al. | 136/246 |
| 2011/0260027 A1* | 10/2011 | Farnham, Jr. | 248/309.1 |
| 2011/0271611 A1* | 11/2011 | Maracci et al. | 52/173.3 |

OTHER PUBLICATIONS

International Search Report for PCT/IB2007/004584 dated Jan. 28, 2009.
International Search Report for PCT/IB2007/004586 dated Mar. 5, 2009.
International Search Report for PCT/IB2007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Knaupp, et al., "Operation of a 10 KW PV Façade with 100 W AC Photovoltaic Modules", 1996 IEEE, 25th PVSC, May 13-17, 1996, pp. 1235-1238, Washington, DC.
PCT/IB2010/052287 International Search Report and Written Opinion dated Sep. 2, 2010.

* cited by examiner

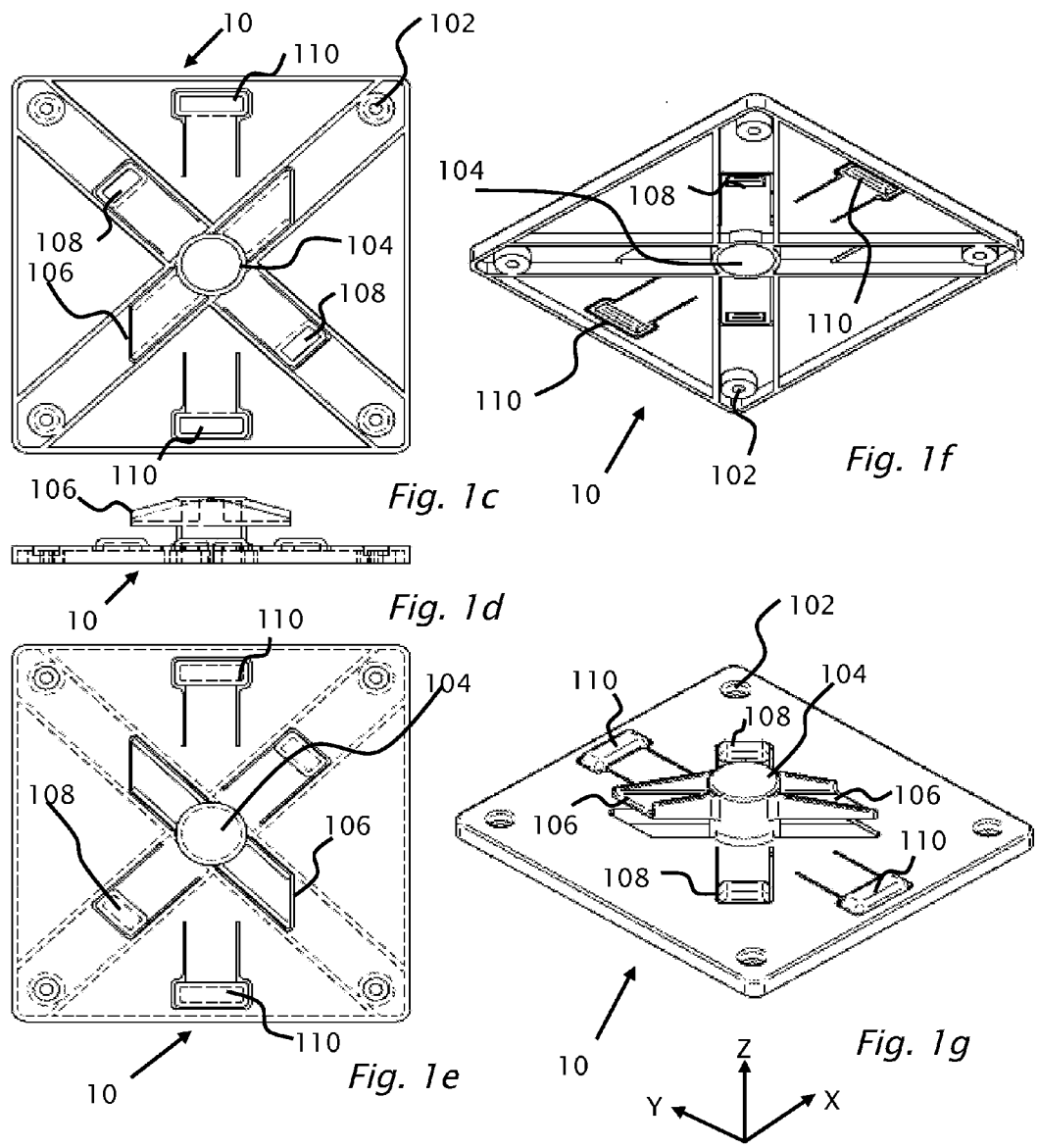

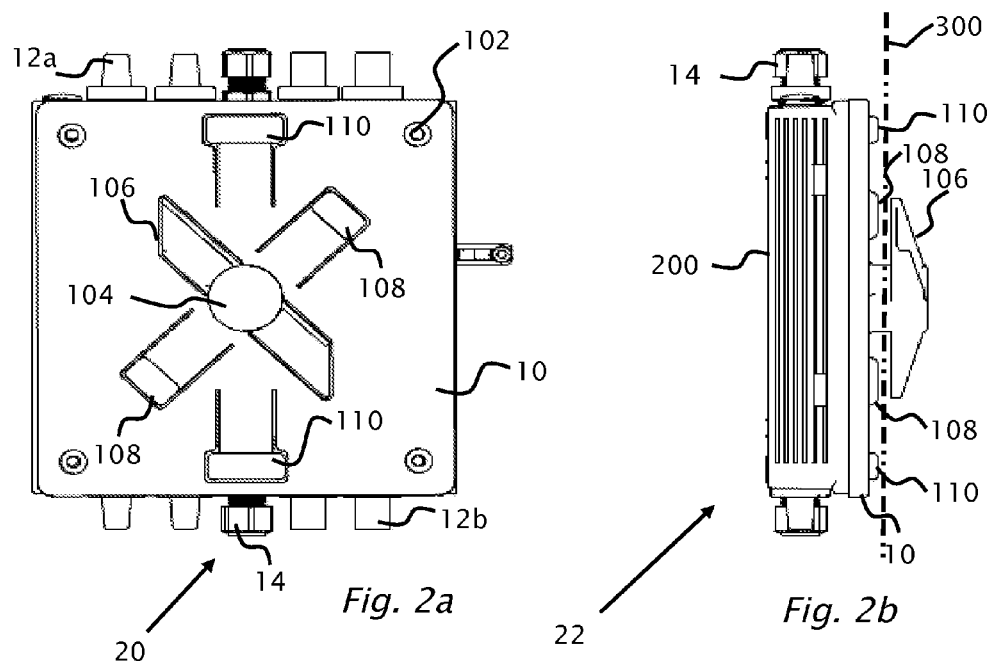

BRACKET FOR CONNECTION OF A JUNCTION BOX TO PHOTOVOLTAIC PANELS

CROSS REFERENCE TO RELATED APPLICATIONS

This application claims benefit from U.S. patent application 61/180,912 filed May 25, 2009, the disclosure of which is incorporated herein by reference.

BACKGROUND

1. Technical Field

The present invention relates to attaching junction boxes to photovoltaic panels and specifically to a bracket for attaching junction boxes to photovoltaic panels.

2. Description of Related Art

A photovoltaic module or photovoltaic panel is a packaged interconnected assembly of photovoltaic cells, also known as solar cells. Since a single photovoltaic module can only produce a limited amount of power, commercial installations include several modules or panels interconnected in serial and in parallel into a photovoltaic array. Electrical connections are made in series to achieve a desired output voltage and/or in parallel to provide a desired amount of current source capability. A photovoltaic installation typically includes the array of photovoltaic modules, an inverter, batteries and interconnection wiring. Electronic modules may be integrated with the photovoltaic modules which perform electrical conversion, e.g. direct current (DC) to direct current conversion, electrical inversion, e.g. micro-inverter, or other functions such as monitoring of performance and/or protection against theft.

An approach for mounting photovoltaic modules on the roofs of buildings is disclosed in U.S. Pat. No. 7,435,897, which discloses attaching a junction box to a bracket as part of a photovoltaic installation.

The term "cable gland" as used herein refers to a device used for the entry of electrical cables or cords into electrical equipment and is used to firmly secure an electrical cable entering a piece of electrical equipment.

The terms "bracket", "mount" and "bracket mount" are used herein interchangeably. The terms "central fastener" and "central pillar" are used herein interchangeably.

BRIEF SUMMARY

According to an aspect of the present invention there is provided a device for attaching a junction box to a photovoltaic panel, the photovoltaic panel having a photovoltaic side and a non-photovoltaic side. The device includes a bracket with a first side attachable to the junction box and a second side attachable to the non-photovoltaic surface of the photovoltaic panel. A central fastener is attachable at one end to the bracket and a plate is adapted for connecting to the other end of the central fastener and for mounting on the photovoltaic panel or frame typically on the photovoltaic side of the panel. One or more rotatable spacers, connectible to the central fastener, may be located on the non-photovoltaic side of the photovoltaic panel. One or more fixed spacers may be located on the non-photovoltaic side connectible to the bracket.

The bracket may attach to respective non-photovoltaic sides of two adjacent photovoltaic panels and the central fastener extends between respective edges of the two adjacent photovoltaic panels. The two adjacent panels are electrically connectible within the junction box. The bracket may also attach to respective non-photovoltaic sides of four adjacent photovoltaic panels, with the central fastener extending between respective corners of the four adjacent photovoltaic panels. The four adjacent panels are typically connected electrically within the junction box.

According to another aspect of the present invention, there is provided a method for attaching a junction box to one or more photovoltaic panels. The photovoltaic panel has a photovoltaic side and a non-photovoltaic side. A first side of a bracket is attached to the junction box and a second side of the bracket is attached to the non-photovoltaic side. A central fastener is attached at one end to the bracket. A plate usually rotatable is connected to the other end of the central fastener and mounted on the photovoltaic side of the photovoltaic panel. One or more spacers are optionally rotatable and connected on the non-photovoltaic side to the central fastener. The bracket may be attached to non-photovoltaic sides of two adjacent photovoltaic panels and the central fastener extends between respective edges of two adjacent photovoltaic panels. The two adjacent photovoltaic panels may be electrically connected within the junction box. Alternatively, the bracket is attached to non-photovoltaic sides of four adjacent photovoltaic panels, and the central fastener extends between respective corners of the four adjacent photovoltaic panels. The four adjacent photovoltaic panels may be connected within the junction box.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein:

FIG. 1c shows a topside plan view of a bracket mount according to an aspect of the present invention.

FIG. 1d shows a side view of a bracket mount according to an aspect of the present invention.

FIG. 1e shows a bottom side plan view of a bracket mount according to an aspect of the present invention.

FIG. 1f shows an isometric view looking at the topside of a bracket mount according to an aspect of the present invention.

FIG. 1g shows an isometric view looking at the bottom side of a bracket mount according to an aspect of the present invention.

FIG. 2a shows a topside plan view of a bracket mount mounted to a junction box according to an aspect of the present invention.

FIG. 2b shows a side view of a bracket mount mounted to a junction box according to an aspect of the present invention.

FIG. 4 shows a flow diagram illustrating a method according to features of the present invention for attaching a junction box to one or more photovoltaic panels.

Figure 1A:
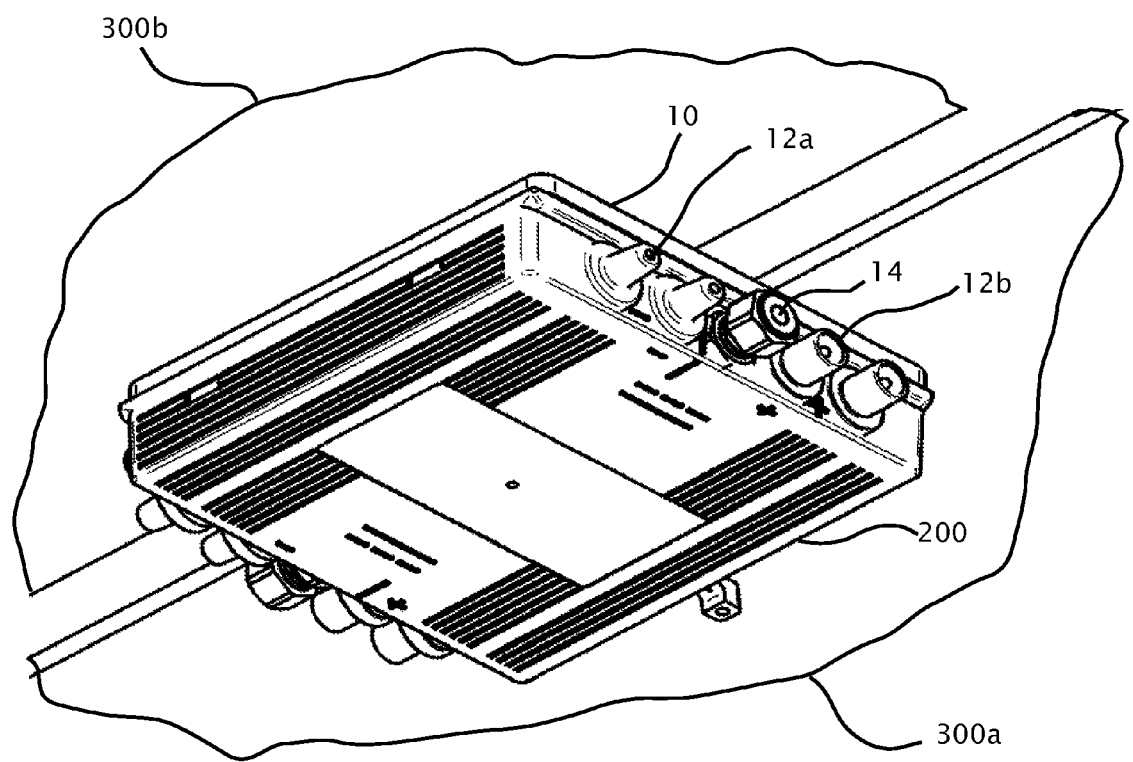
FIG. 1a shows a junction box mechanically attached to two photovoltaic panels by a bracket according to an aspect of the present invention.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The aspects are described below to explain the present invention by referring to the figures.

Before explaining aspects of the invention in detail, it is to be understood that the invention is not limited in its application to the details of design and the arrangement of the components set forth in the following description or illustrated in the drawings. The invention is capable of other aspects or of being practiced or carried out in various ways. Also, it is to be understood that the phraseology and terminology employed herein is for the purpose of description and should not be regarded as limiting.

Reference is now made to FIG. 1a which shows a junction box 200 mechanically attached to two photovoltaic panels 300b and 300a respectively by a bracket 10 according to an aspect of the present invention. Junction box 200 is typically mounted on the non photovoltaic sides of panels 300a and 300b. Junction box 200 may typically contain a circuit board and connection terminals which are both used to terminate cables entering and leaving junction box 200 using cable glands 14, male socket connectors 12a and female socket connectors 12b. Junction box 200 typically provides a way for connecting panels 300a and 300b electrically together. The junction box may be passive including connector and wires, and possibly passive elements such as diodes, or active—e.g. containing a circuit board inside that implements a direct current (DC) to alternating current (AC) inverter or a DC to DC converter. Junction box 200 is attached to a bracket or mount 10 and bracket 10 is used to attach junction box 200 to photovoltaic panels 300a and 300b.

Figure 1B:
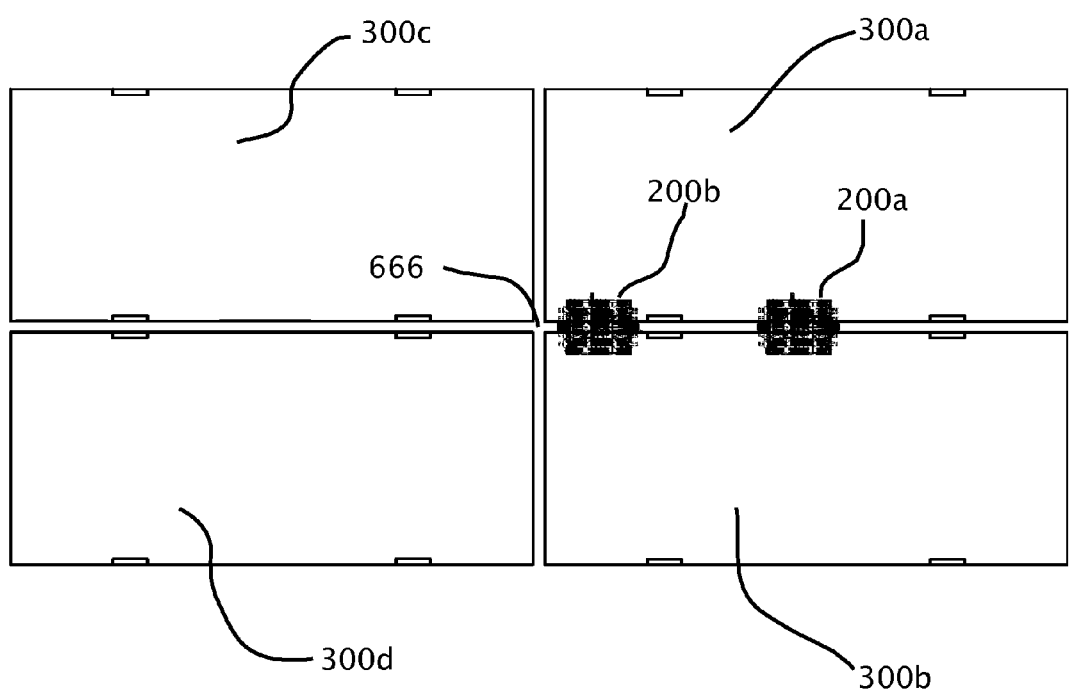
FIG. 1b shows two junction boxes, which may be mounted (using a bracket) in various positions on multiple panels, according to an aspect of the present invention.

Reference is now made to FIG. 1b which shows junction boxes 200a and 200b, which may be mounted (using bracket 10) in various positions on multiple panels 300a, 300b, 300c or 300d, according to an aspect of the present invention. Junction box 200a may be used to connect panels 300a and 300b electrically together. Alternatively, junction box 200b shown located near cross point 666 or at cross point 666 of panels 300 may be used to connect panels 300a, 300b, 300c or 300d electrically together.

Reference is now made to FIGS. 1c, 1d and 1e which show top side plan view, a side view and a bottom side plan view respectively of a bracket mount 10 according to an aspect of the present invention. Bracket mount 10 has a four mounting holes 102 used to secure bracket mount 10 to junction box 200. Bracket 10 also has two fixed positioned spacers 110 which are preferably spring loaded and two adjustable position spacers 108 which are also preferably spring loaded. Plate 106 swivels around a central pillar 104 such that plate 106 is parallel to the X Y plane shown in FIG. 1e.

Reference is now made to FIGS. 1f and 1g which show an isometric views looking at the topside and bottom side of bracket 10 according to an aspect of the present invention. FIGS. 1f and 1g show the four mounting holes 102, two fixed positioned spacers 110, the two adjustable position spacers 108, plate 106 and central pillar 104.

Reference is now made to FIGS. 2a and 2b which show a plan view 20 and side view 22 of bracket mount 10 attached to junction box 200 via four mounting holes 102 according to an aspect of the present invention. FIGS. 2a and 2b show the two fixed positioned spacers 110, the two adjustable position spacers 108, plate 106, central pillar 104, bracket mount 10 and junction box 200 along with cable glands 14, male socket connectors 12a and female socket connectors 12b.

Figures 3A, 3B:
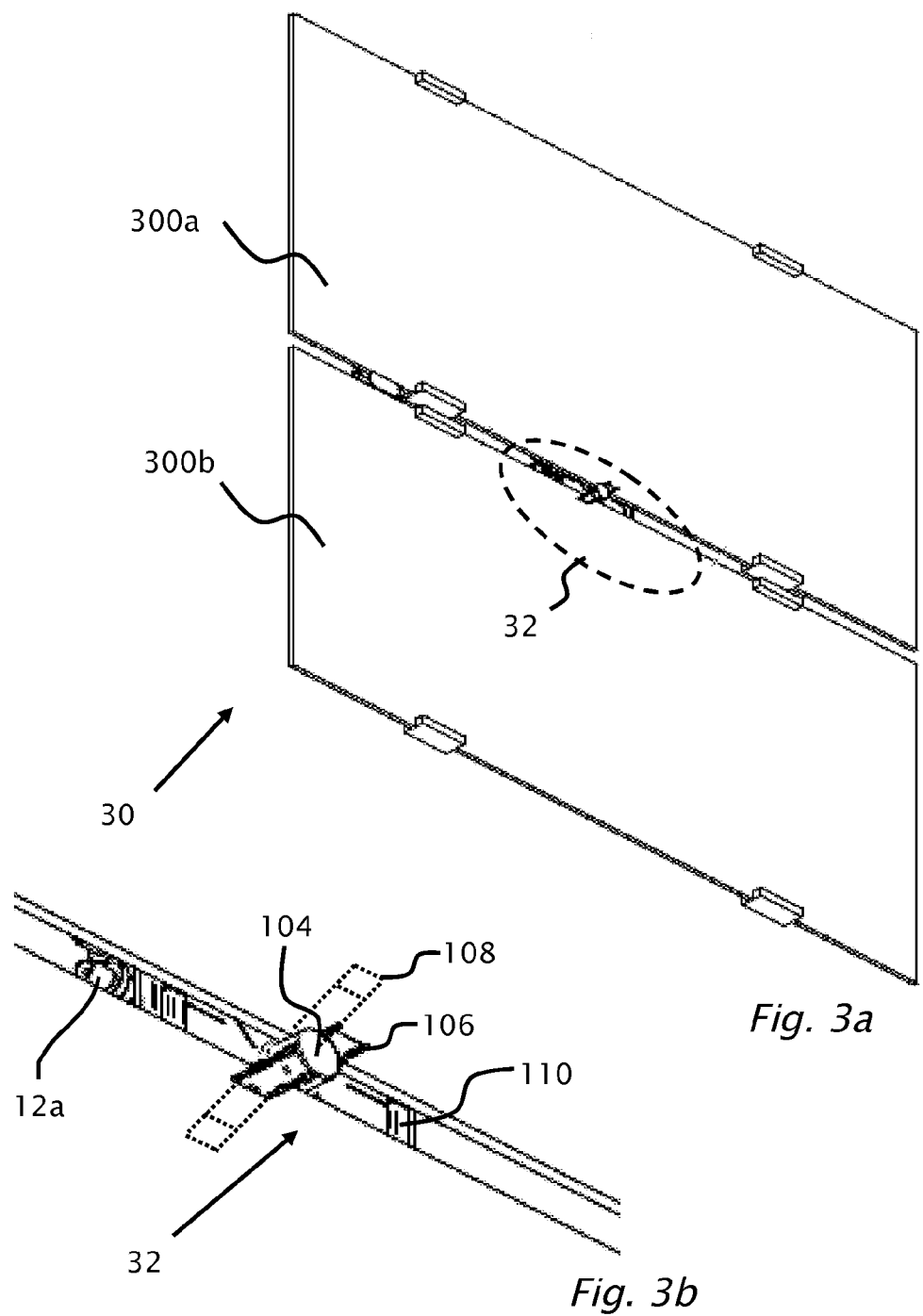
FIG. 3a shows the photovoltaic side of two solar panels with a bracket mount and a junction box attached in between the two solar panels according to an aspect of the present invention.
FIG. 3b shows further details of a bracket mount and a junction box attached in between two solar panels according to an aspect of the present invention.

Reference is now made to FIGS. 3a and 3b which show an isometric view 30 and isometric view of area 32 respectively according to an aspect of the present invention. FIG. 3a shows the photovoltaic side of two solar panels 300a and 300b with bracket mount 10 (attached to junction box 200) attached in between two solar panels 300a and 300b (shown by area 32). FIG. 3b shows further details of the isometric view of area 32. With bracket mount 10 attached to junction box 200, bracket mount 10 and junction box 200 are located on the non-photovoltaic side of solar panels 300a and 300b. Central pillar 104 protrudes between solar panels 300a and 300b with plate 106 twisted around central pillar 104 so that plate 106 is in contact with the photovoltaic side of panels 300a and 300b. The two fixed positioned spring loaded spacers 110 and the two adjustable spring loaded position spacers 108 (shown with a dotted line) allow bracket 10 (attached to junction box 200) to clamp onto panels 300a and 300b. Through a gap between panels 300a and 300b can be seen fixed positioned spacers 110 and a male socket connector 12a.

Reference is now also made to FIG. 4, a flow diagram illustrating a method according to features of the present invention for attaching junction box 200 to one or more photovoltaic panels 300. A first side of bracket 10 is attached (step 41) to junction box 200 and a second side of bracket 10 is attached (step 41) to the non-photovoltaic side. A central fastener 104 is attached (step 43) at one end to bracket 10. Bracket 10 may be previously assembled with the fastener 104, and the installer only mounts the junction box 200 to bracket 10, and then mount bracket 10 to panel 300 Plate 106 is rotatably connected (step 45) to the other end of the central fastener 104 and mounted on the photovoltaic side of photovoltaic panel 300. One or more rotatable spacers 108 are connected on the non-photovoltaic side to the central fastener. Bracket 10 may be attached to non-photovoltaic sides of two adjacent photovoltaic panels 300 and central fastener 104 extends between respective edges of two adjacent photovoltaic panels 300. The two adjacent photovoltaic panels 300 may be electrically connected within junction box 200. Alternatively, bracket 10 is attached to non-photovoltaic sides of four adjacent photovoltaic panels 300, and central fastener 104 extends between respective corners of the four adjacent photovoltaic panels 300. The four adjacent photovoltaic panels 300 may be connected within junction box 200.

The definite articles "a", "an" is used herein, such as "a bracket", "a junction box" have the meaning of "one or more" that is "one or more brackets" or "one or junction boxes".

Examples of various features/aspects/components/operations have been provided to facilitate understanding of the disclosed embodiments of the present invention. In addition, various preferences have been discussed to facilitate understanding of the disclosed embodiments of the present invention. It is to be understood that all examples and preferences disclosed herein are intended to be non-limiting.

Although selected embodiments of the present invention have been shown and described individually, it is to be understood that at least aspects of the described embodiments may be combined. Also although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

We claim:

1. A device comprising:
   a junction box;
   a bracket including a first side and a second side, the first side adapted to attach to a side of the junction box and the second side positioned opposite the first side and adapted to attach to a non-photovoltaic side of a photovoltaic panel;
   a central fastener having first and second ends, the first end attached to said bracket; and
   a plate attached to the second end of said central fastener, wherein said plate is adapted to mount on the photovoltaic panel, and wherein the plate, central fastener, and bracket are adapted to suspend the bracket and junction box from the photovoltaic panel by clamping the photovoltaic panel between the second side of the bracket and the plate.

2. The device of claim 1, wherein said plate is adapted to mount on a photovoltaic side of the photovoltaic panel.

3. The device of claim 1, further comprising a rotatable spacer connected to and rotatable around the central fastener and adapted for mounting between the second side and the non-photovoltaic side.

4. The device of claim 1, wherein the bracket comprises a fixed spacer connected to said second side of the bracket, said fixed spacer being adapted for mounting in compression contact with the non-photovoltaic side of the photovoltaic panel.

5. The device of claim 4, wherein the fixed spacer is spring loaded.

6. The device of claim 1, wherein said bracket is adapted to attach to respective non-photovoltaic sides of two adjacent photovoltaic panels, wherein said central fastener extends between respective edges of said two adjacent photovoltaic panels.

7. The device of claim 6, wherein said two adjacent panels are electrically connectible within the junction box.

8. The device of claim 1, wherein the bracket is adapted to attach to respective non-photovoltaic sides of four adjacent photovoltaic panels, wherein said central fastener extends between respective corners of said four adjacent photovoltaic panels.

9. The device of claim 8, wherein said four adjacent panels are electrically connectible within the junction box.

10. The device of claim 1, further comprising a spacer rotatable around the central fastener, a rotation of the spacer around the central fastener being independent of angular positions of the plate and the bracket around the central fastener, said spacer being adapted to mount between the second side of the bracket and the non-photovoltaic side of the photovoltaic panel.

11. A method comprising:
    attaching a first side of a bracket to a junction box;
    attaching a second side of said bracket, positioned opposite the first side, to a non-photovoltaic side of a photovoltaic panel;
    attaching a plate on a photovoltaic side of the photovoltaic panel; and
    connecting the plate to said bracket by a central fastener, wherein the plate, central fastener, and bracket are adapted to suspend the bracket and junction box from the photovoltaic panel by clamping the photovoltaic panel between the second side of the bracket and the plate.

12. The method of claim 11, wherein the central fastener includes first and second ends, the method further comprising attaching said central fastener at the first end to said bracket and at the second end to said plate.

13. The method of claim 11, further comprising connecting a spacer to said central fastener and mounting the spacer between the second side of the bracket and the non-photovoltaic side of the photovoltaic panel, wherein said spacer is rotatable around the central fastener, and wherein a rotation of the spacer around the central fastener is independent of angular positions of the plate and the bracket around the central fastener.

14. The method of claim 11, further comprising attaching said bracket to respective non-photovoltaic sides of two adjacent photovoltaic panels; and
    extending said central fastener between respective edges of the two adjacent photovoltaic panels.

15. The method of claim 14, further comprising electrically connecting said two adjacent photovoltaic panels within the junction box.

16. The method of claim 11, further comprising:
    attaching said bracket to respective non-photovoltaic sides of four adjacent photovoltaic panels; and
    extending said central fastener between respective corners of said four adjacent photovoltaic panels.

17. The method of claim 16, further comprising electrically connecting said four adjacent photovoltaic panels within the junction box.

18. A device comprising:
    a junction box;
    a bracket with a first side attachable to the junction box and a second side attachable to a non-photovoltaic side of a photovoltaic panel;
    a central fastener having first and second ends, the first end attachable to said bracket;
    a plate adapted for connection to the second end of said central fastener, wherein said plate is adapted for mounting on the photovoltaic panel; and
    a spacer connected to the central fastener, wherein the spacer is adjustable in position in a space between the second side and the non-photovoltaic side.

19. The device of claim 18, wherein the spacer is rotatable around the central fastener.

20. The device of claim 18, wherein the spacer is spring-loaded.

* * * * *